Figure 1:
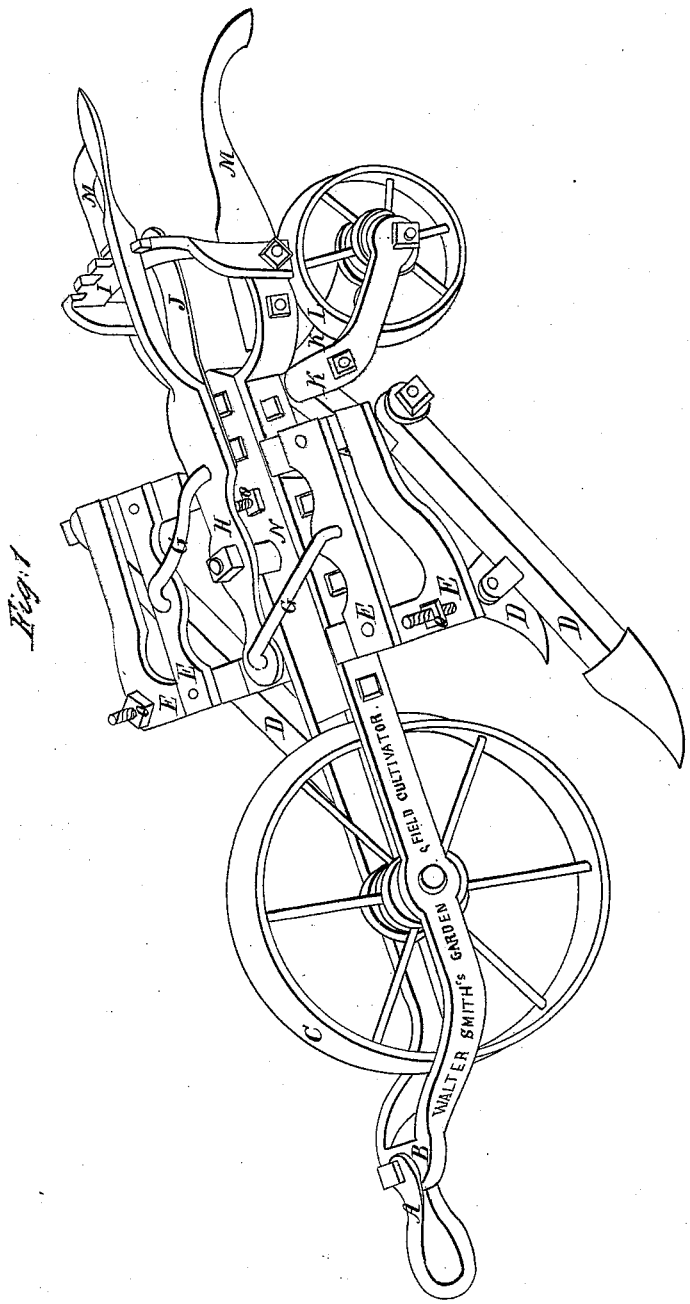

W. Smith.
Cultivator.

N° 93,017.   Patented Jul. 27, 1869.

Witnesses.
Ayeohlyer
M R Anthes

Inventor.
Walter Smith

UNITED STATES PATENT OFFICE.

WALTER SMITH, OF BOONVILLE, INDIANA.

IMPROVEMENT IN CULTIVATORS.

Specification forming part of Letters Patent No. 93,017, dated July 27, 1869.

*To all whom it may concern:*

Be it known that I, WALTER SMITH, of the town of Boonville, in the county of Warrick and State of Indiana, have invented a new and useful improvement in cultivators, adapted to the cultivation of the soil both in the garden and the field, called "Walter Smith's Garden and Field Cultivator;" and I do declare that the following is a full, clear, and exact description of the construction and operation of the same, reference being had to the accompanying or annexed drawing, making a part of this specification, and presenting a perspective view of my invention.

A is the clevis. B is the frame. C is the front wheel. D are the plows. E is the slide. G are the regulators. H is the gage-lever. I is the gage. J is the gage-spring. K are the wheel-hangers. L is the hind wheel. M are the handles. N is the frame-brace. O are the setter-screws.

To enable others to make and use my invention, I will proceed to describe its construction and operation.

It is a cultivator mounted on wheels, one wheel being in the front and the other in the rear of the plows. The clevis is made of iron, to which the team is to be hitched. The front wheel is of iron, or it may be made of wood, and is supported by its axles penetrating through the frame on each side. The hind wheel is also of iron or may be made of wood, and is supported by iron wheel-hangers attached to the under side of the frame, as represented in the drawing. These wheels revolve when the cultivator is in motion. They add to the facility of its movement, and hold the plows to their set depth in the earth. By the use of the setter-screw the plows are all set to their proper depth and may be elevated or lowered at pleasure. The setter-screw consists of an iron hinge, with a shank or bolt at one end fastened through the beam of the plow, and at the other end a screw is attached, which passes through the iron slide and is regulated by a nut above the slide. The slide is constructed of iron, as represented in the drawing, and is brought nearer to or removed farther from the frame to suit the width of the row or furrow to be plowed. The regulators are iron or steel rods of proper size and strength, connecting the slide to the gage-lever, which is a lever of iron, fastened to the frame between the slides and reaching back to a convenient behind the gage. The gage is constructed of iron in the shape of the section of a circle, with shafts or arms reaching down at right angles and fastening to the outer sides of the handles. The upper edge of this gage is cut into a succession of notches, into which the gage-lever is inserted in regulating the width of the cultivator. By moving the handle of the gage-lever to the right, the plows of the cultivator are separated or widened farther from each other, and by a reverse movement the plows are brought nearer together. The regulators can readily be so changed in position that the same action of the gage-lever would produce the opposite effect on the position of the plows. The gage-lever has a spring firmly attached to the lower side, near the center, and reaching back a little beyond the gage. This spring is to hold the lever firmly in the notch in which it is placed. The beams of the two outside or lateral plows are fastened to the outer rear of the slide. The beam of the center plow is fastened by an iron bolt between the hangers of the hind wheel.

This machine can be used with great advantage in breaking up the soil, even before planting, when there is not much turf, and is admirably adapted to the cultivation of all kinds of crops that are planted in rows or drills. The wheels make it run much easier as well as much more steady and regular. The plows may be set to any depth and regulated to any desired width. They can be so adjusted as to plow one or more rows or drills at the same time.

This machine is designed for both garden and field culture.

I do not claim the plows, the handles, or the clevis as my invention; but

What I do claim as my invention, and desire to secure by Letters Patent, is—

The frame B, the wheels C L, the gage H, the gage-lever I and gage-spring J, the slides E, the regulators G, and the setter-screws O, and their application to and co-operation with the plows, handles, and clevis.

WALTER SMITH.

Witnesses:
AZRA DYER,
M. R. ANTHY.